United States Patent

Kim

[11] Patent Number: 5,832,130
[45] Date of Patent: Nov. 3, 1998

[54] IMAGE SIGNAL CODING DEVICE AND METHOD THEREFOR

[75] Inventor: Jae-hyun Kim, Suwon, Rep. of Korea

[73] Assignee: Samsung Electronics Co., Ltd., Kyungki-Do, Rep. of Korea

[21] Appl. No.: 705,864

[22] Filed: Aug. 28, 1996

[30] Foreign Application Priority Data

Aug. 28, 1995 [KR] Rep. of Korea ........................ 95-26935

[51] Int. Cl.[6] ............................... G06K 9/36; G06K 9/46
[52] U.S. Cl. ........................... 382/248; 382/239; 382/251
[58] Field of Search .................................... 382/234, 239, 382/245, 246, 248, 250, 251; 348/405, 420

[56] References Cited

U.S. PATENT DOCUMENTS 5,263,100  11/1993  Kim et al. ............................... 382/239

FOREIGN PATENT DOCUMENTS

0618 733 A2  10/1994  European Pat. Off. .

Primary Examiner—Phuoc Tran
Attorney, Agent, or Firm—Sughrue, Mion, Zinn, Macpeak & Seas, PLLC

[57] ABSTRACT

Image signal coding device employing a quantization step size selecting unit which includes a multi-step quantization unit for performing quantization on the small blocks output from an orthogonal transform coding unit according to a plurality of predetermined quantization step sizes, multi-step run length coding unit for performing run length coding on the coefficients output from the multi-step quantizer, multi-step variable length coding unit for performing variable length coding on the coefficients output the multi-step run length coding unit, and a multi-step accumulating unit for accumulating the code length output from the variable length coding unit in units of small blocks, and for accumulating predetermined reference small blocks in units of large blocks. A normalizing unit performs normalization by using the code length accumulated in small block units and the code length accumulated in the reference large block unit, and allocates a new target code length to each small block. The quantization step size selecting unit selects a quantization step size capable of outputting the closest value to the target code length of the normalizing unit among a plurality of quantization step sizes given respectively to the small blocks output from the multi-step accumulating unit.

11 Claims, 6 Drawing Sheets

IMAGE SIGNAL CODING DEVICE AND METHOD THEREFOR

BACKGROUND OF THE INVENTION

The present invention relates to an image signal coding device for compressing and recording a digital image signal in a digital video tape recorder (referred to as DVCR hereinafter) and a method therefor, and more particularly, to a quantization device and a method therefor capable of performing compressive coding wherein input signals undergo compressive coding in a predetermined unit by allocating a predetermined coding amount of input signals.

Development of DVCRs is directed to an increase in recording density of a video tape, improvement of a digital compression method, and development of digital circuit technology. At present, the DVCR has many advantages including maintaining picture quality in spite of repeated reproduction. Thus, the change from an analog VCR to a DVCR is inevitable.

As an international standard with respect to the DVCR of a standard video image is determined, the need for DVCRs will be increased and the applied field will open up in the future. At present, most specifications of a DVCR are already fixed and an extremely limited number of parts are left for the manufacturer to modify at his discretion and such parts dominate the efficiency of a DVCR.

The present invention provides a quantization width production method and apparatus which plays an important role on the efficiency of such a device, particularly in picture quality. Because a digital image signal should be recorded in a frame unit on a predetermined number of video tracks of a video tape, a variable length coding method may create a problem due to its irregular output in compressively recording the image signal. That is, the output image signal after being compressed may be shorter or longer than a fixed target length. In such case, the quality of the decompressed picture is deteriorated or damaged. Therefore, a method for outputting an image signal whose code length is close to the fixed target length, by using an allocated area as effectively as possible, is essential to the DVCR image signal compressive coding.

Moreover, high speed seeking, which is an additional function of the DVCR, is essential. However, it presents a difficult problem. In an analog VCR, high speed seeking is performed by decompressing and displaying what is read as it is without using a special method. Because the DVCR employs a variable length coding, no signal can be decompressed if all signals have not been read. For such high speed seeking, the compressed code length needs to be fixed in an independent block unit as small as possible. Therefore, the variable length coding is performed in a segment unit which is constituted by a predetermined number of macroblocks, and the code length thereof is fixed. A macroblock is constituted by five DCT blocks each of which has a size of 8×8, composed of four luminance components and two color difference components. High speed seeking efficiency can be improved by reducing the independent coding unit from a frame into a smaller unit. As compared with arranging signal data in a frame unit, arranging it in a segment unit may be effective for high speed seeking, but it may do relative damage to picture quality in view of compression.

When the coding length for compressive coding is fixed in a segment unit, the most important step effective to the efficiency is a quantization step. A compression step can largely be divided into a variable length coding step and a quantization step. In the variable length coding step, a signal having undergone a run length coding step is simply coded by a variable length code table, and thus the possibility of errors occurring is nonexistent. Thus, to reach a fixed code length, adequate quantization is essential.

Despite an increase of recording density of the DVCR, because data quantity of digital video signals, especially the data quantity of a movie lasting more than two hours, is too vast to be digitally converted as it is and the digitally converted video signals are recorded on a video tape, more effective compression is required. In addition, the compression should be adequate for high speed seeking which is one of the basic functions of the DVCR.

SUMMARY OF THE INVENTION

It is an object of the present invention to provide a quantization step size selector to perform effective quantization in compression coding.

Another object of the present invention is to provide a quantization step size selecting method for performing effective quantization.

To obtain the first object, there is provided an image signal coding device employing a quantization step size selecting unit which is constituted by a multi-step quantization unit for performing quantization on the small blocks output from an orthogonal transform coding unit according to a plurality of predetermined quantization step sizes. The device further includes a multi-step run length coding unit for performing run length coding on the coefficients output from the multi-step quantizer, a multi-step variable length coding unit for performing variable length coding on the coefficients output from the multi-step run length coding unit, a multi-step accumulating unit for accumulating the code length output from the variable length coding unit in units of small blocks, and for accumulating predetermined reference small blocks in units of large blocks. A normalizing unit is provided for performing normalization by using the code length accumulated in small block units and the code length accumulated in the reference large block unit, and for allocating a new target code length to each small block. A quantization step size selecting unit is further provided for selecting a quantization step size capable of outputting the closest value to the target code length of the normalizing unit among a plurality of quantization step sizes given respectively to the small blocks output from the multi-step accumulating unit.

To obtain the second object, there is provided an image signal compressive coding method employing a quantization step size selecting method including the steps of performing multi-step quantization on the small blocks according to a plurality of fixed quantization step sizes; performing run length coding on the coefficients output from the multi-step quantization step; performing variable length coding on the codes output from the multi-step run length coding step; performing multi-step accumulation by accumulating the orthogonal transform unit of code lengths output from the multi-step variable length coding step in units of a small block, respectively, and accumulating the reference small blocks in units of the reference large block.

The method further includes the steps of performing normalization according to the code length accumulated in a reference large block unit and the code lengths accumulated in a small block unit, and then allotting a new available code length to each small block, wherein the new available code length is obtained by multiplying the code length of the reference small block by an available fixed code length corresponding to a large block and then dividing the result by the code length of the reference large block; and selecting a quantization step size capable of outputting the closest value to the new available code length output from the normalizing step among the plurality of quantization step sizes given to each small block in the multi-step accumulation step.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
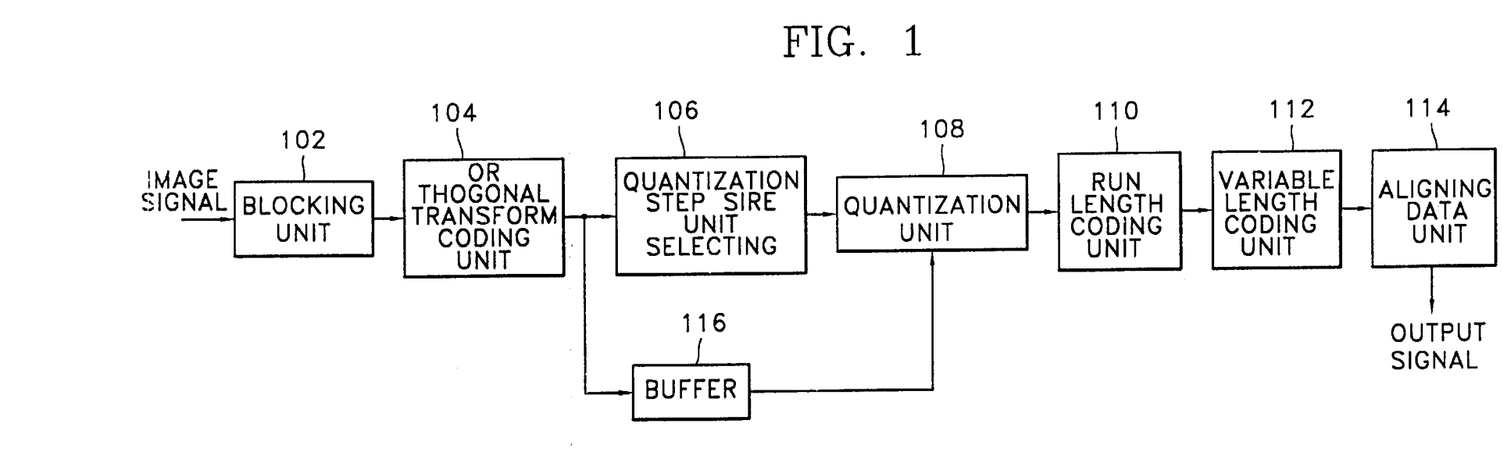
FIG. 1 is a block diagram showing the constitution of a compressive coder for an image signal according to an embodiment of the present invention.

As shown in FIG. 1, the compressive coding device for an image signal includes a blocking unit 102 for blocking image signals, an orthogonal transform coding unit 104 for performing orthogonal transform coding, a quantization step size selecting unit 106 for selecting a quantization step size, a buffer 116 for delaying the orthogonal transform coefficients during the quantization step size selecting step, a quantization unit 108 for performing quantization according to the selected quantization step size, a run length coding unit 110 for performing run length coding, a variable length coding unit 112 for variable-length-coding the run length code, and a data aligning unit 114 for realigning the signals output from the variable length coding unit 112 to record them in a fixed format.

Figure 2:
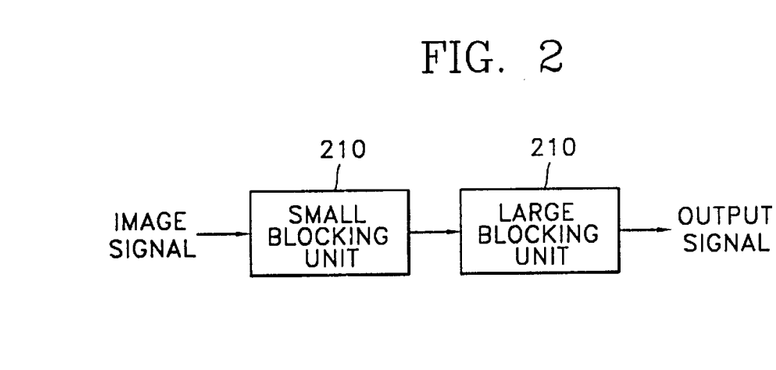
FIG. 2 is a block diagram showing the elements of the blocking unit shown in FIG. 1.

Referring to FIG. 2, which illustrates the blocking unit 102 shown in FIG. 1, the blocking unit includes a small blocking unit 210 and a large blocking unit 212.

Figure 3:
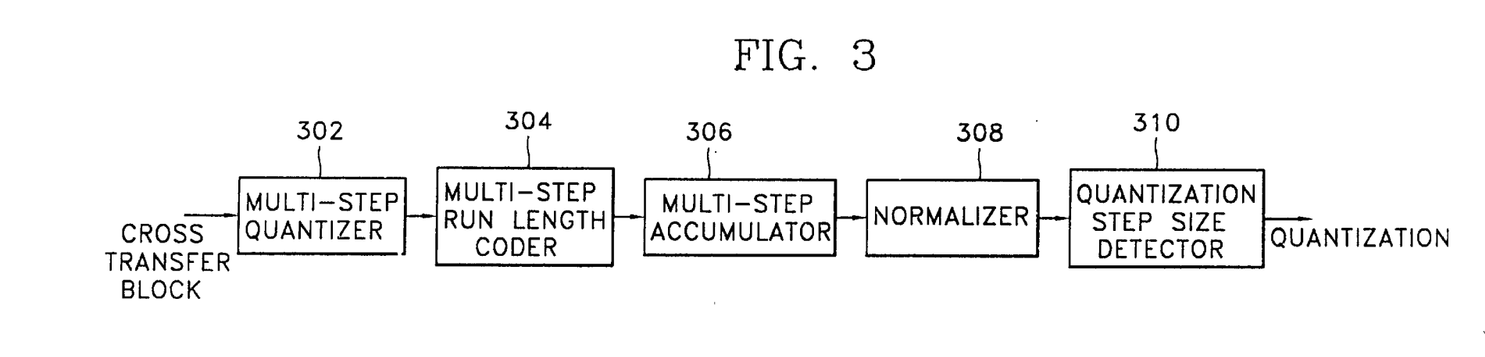
FIG. 3 is a block diagram showing an embodiment of the quantization step size selecting unit shown in FIG. 1.

Referring to FIG. 3, an embodiment of the quantization step size selecting unit 106 of FIG. 1 is illustrated. The quantization step size selecting unit 106 includes a multi-step quantizer 302 which receives the output of the orthogonal transform coding unit 104, a multi-step run length coder 304, a multi-step accumulator 306, a normalizer 308, and a quantization step size selector 310 connected to the quantization unit 108 (see FIG. 1).

Figure 4:
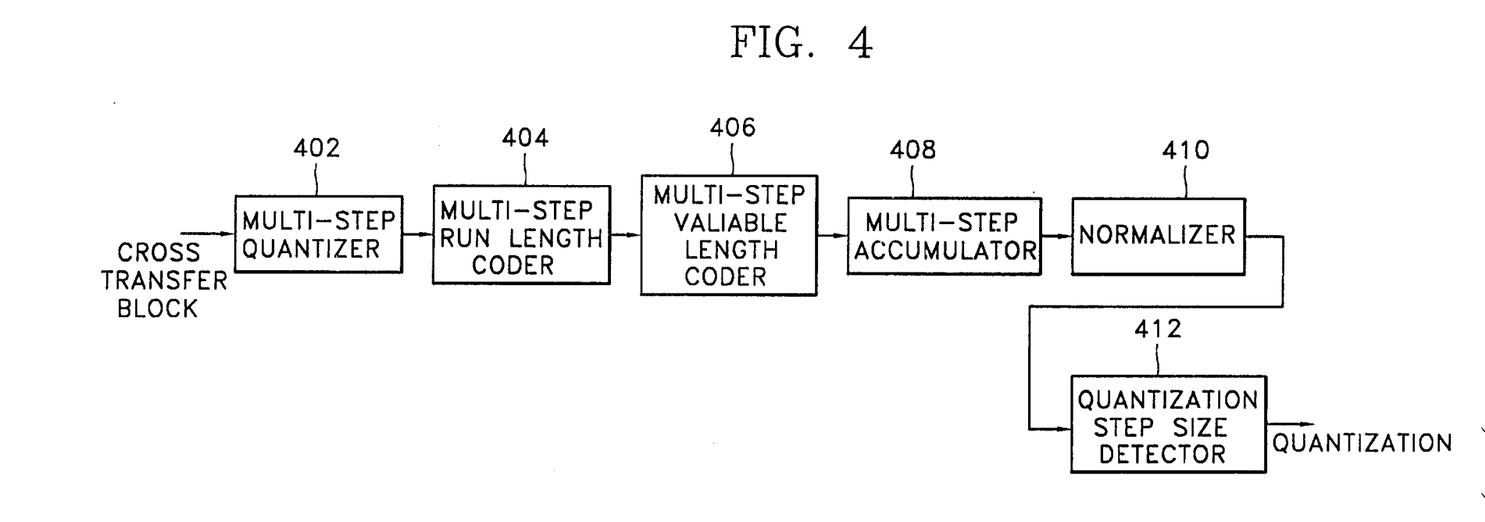
FIG. 4 is a block diagram showing another embodiment of the quantization step size selecting unit shown in FIG. 1.

Referring to FIG. 4, another embodiment of the quantization step size selecting unit 106 of FIG. 1 is shown. The quantization step size selecting unit 106 includes a multi-step quantizer 402 which receives the output of the orthogonal transform coding unit 104, a multi-step run length coder 404, a multi-step variable length coder 406, a multi-step accumulator 408, a normalizer 410, and a quantization step size selector 412 connected to the quantization unit 108 (see FIG. 1).

Figure 5A:
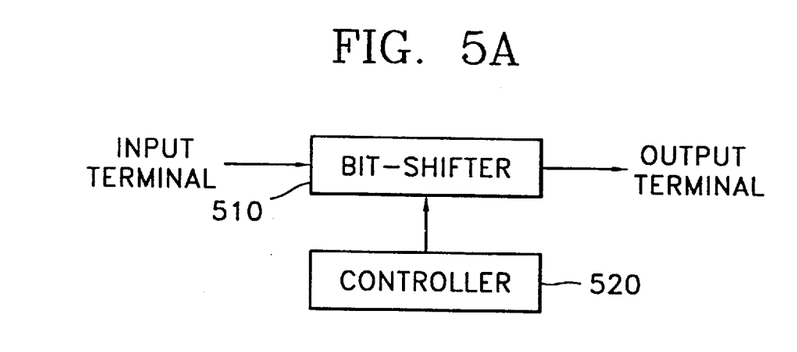
FIG. 5A is a block diagram showing an embodiment of the quantization unit shown in FIG. 1.

Referring to FIG. 5A, an embodiment of the quantization unit 108 of FIG. 1 is illustrated. The quantization unit 108 includes a bit-shifter 510 for bit-shifting an input signal, and a controller 520 for controlling the bit-shifter 510.

Figure 5B:
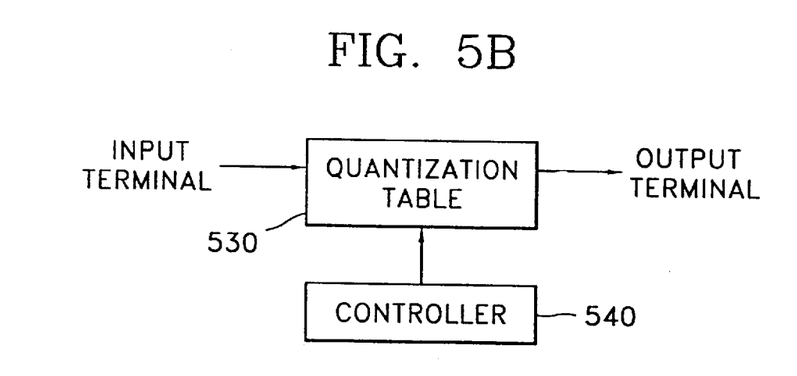
FIG. 5B is a block diagram showing another embodiment of the quantization unit shown in FIG. 1.

Referring to FIG. 5B, another embodiment of the quantization unit 108 of FIG. 1 is shown wherein the quantization unit includes a quantization table 530, and a controller 520 for controlling the quantization table 530.

Figure 6:
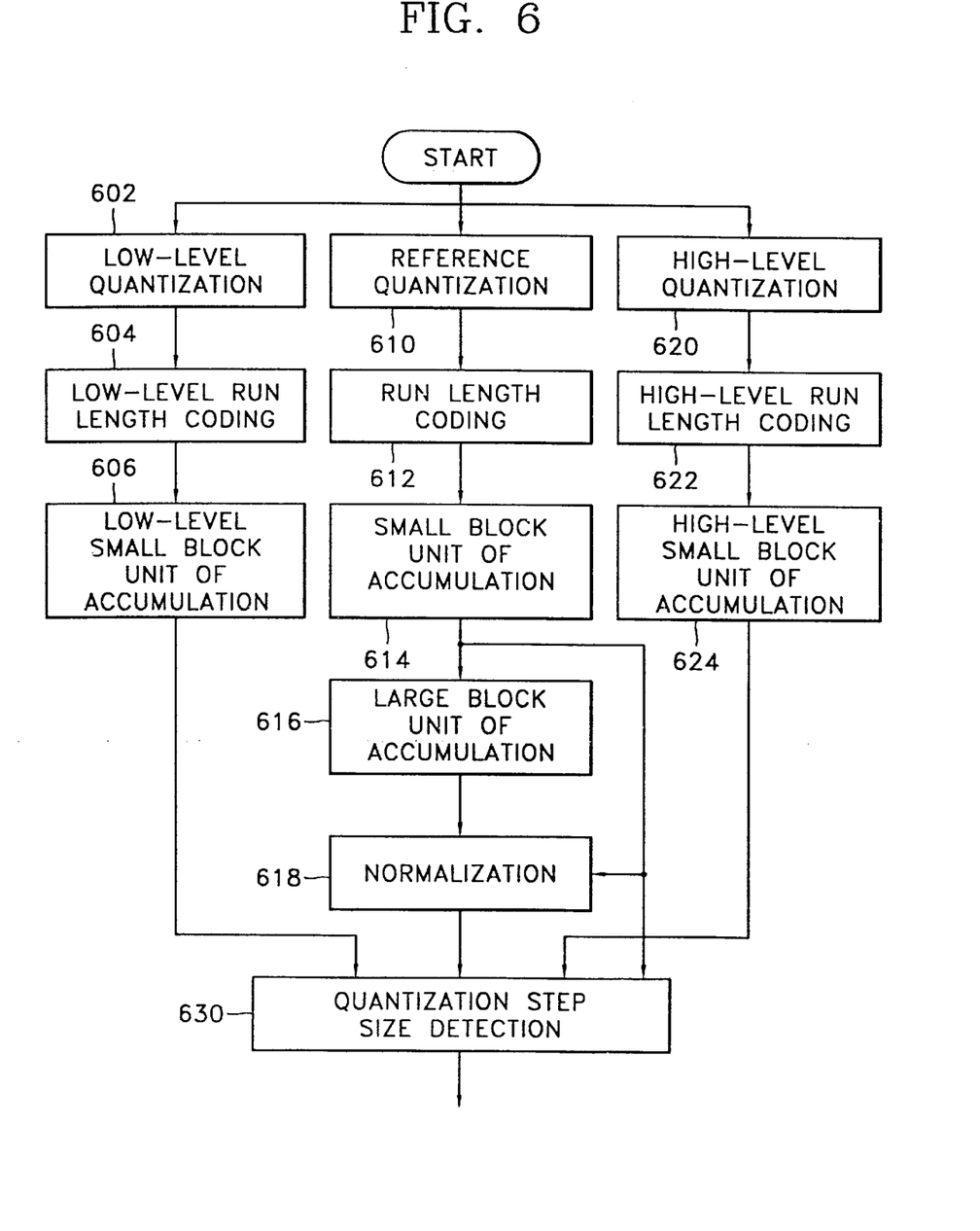
FIG. 6 is a flow chart outlining the operation of the embodiment shown in FIG. 3.

FIG. 6 is a flow chart outlining the operation of the quantization step size selecting unit 106 according to an embodiment of the present invention shown in FIG. 3. The operation includes multi-step quantization processes 602, 610 and 620, multi-step run length coding processes 604, 612, and 622, multi-step small block unit accumulation processes 606, 614 and 624, a large block unit accumulation process 616, a normalizing process 618, and a quantization step size selecting process 630.

Figure 7:
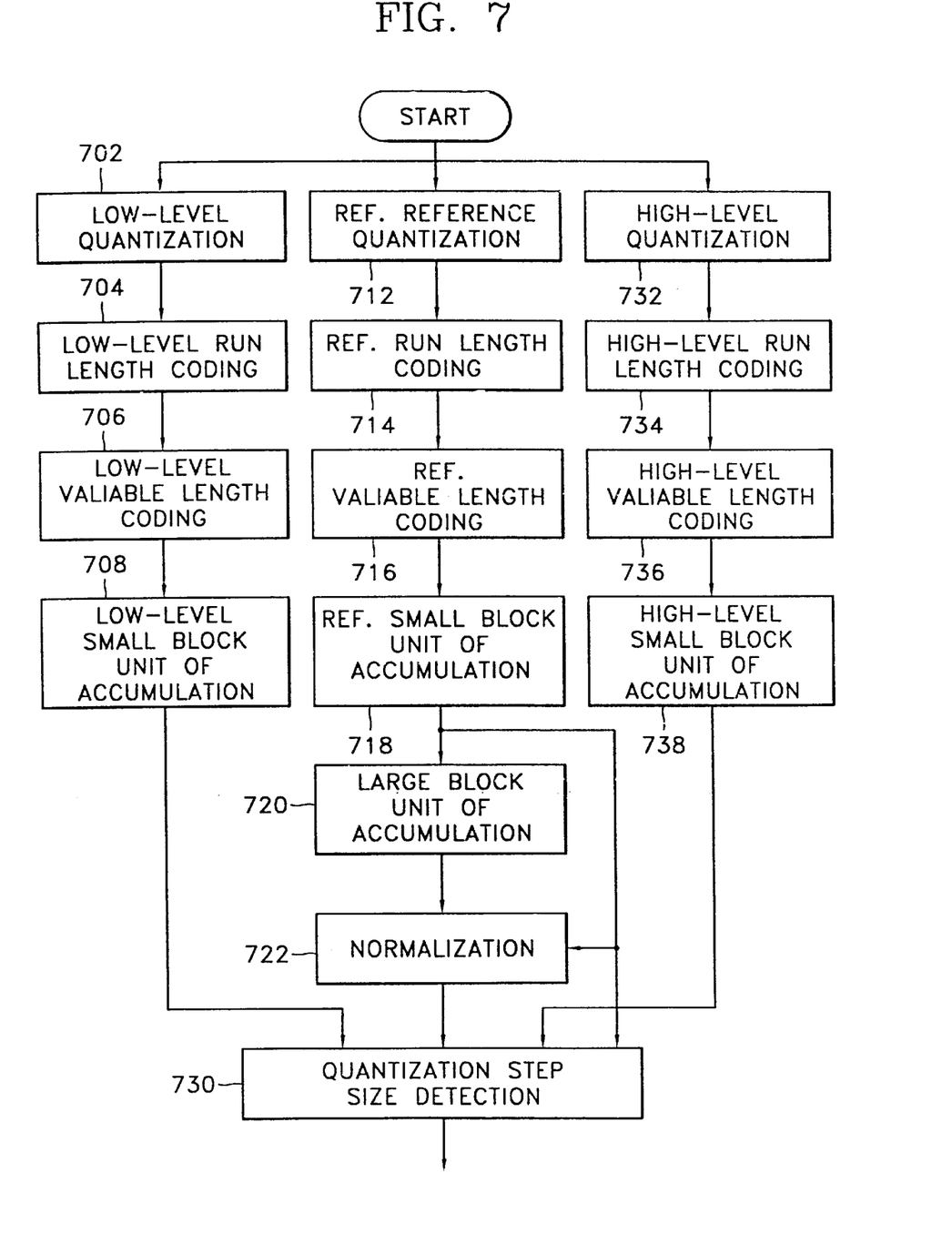
FIG. 7 is a flow chart outlining the operation of the embodiment shown in FIG. 4.

FIG. 7 is a flow chart outlining the operation of the quantization step size selecting unit 106 according to another embodiment of the present invention shown in FIG. 4. The operation includes multi-step quantization processes 702, 712 and 732, multi-step run length coding processes 704, 714 and 734, multi-step variable length coding processes 706, 716 and 736, multi-step small block unit accumulation processes 708, 718 and 738, a large block unit accumulation process 720, a normalizing process 722, and a quantization step size selection process 730.

Figure 8:
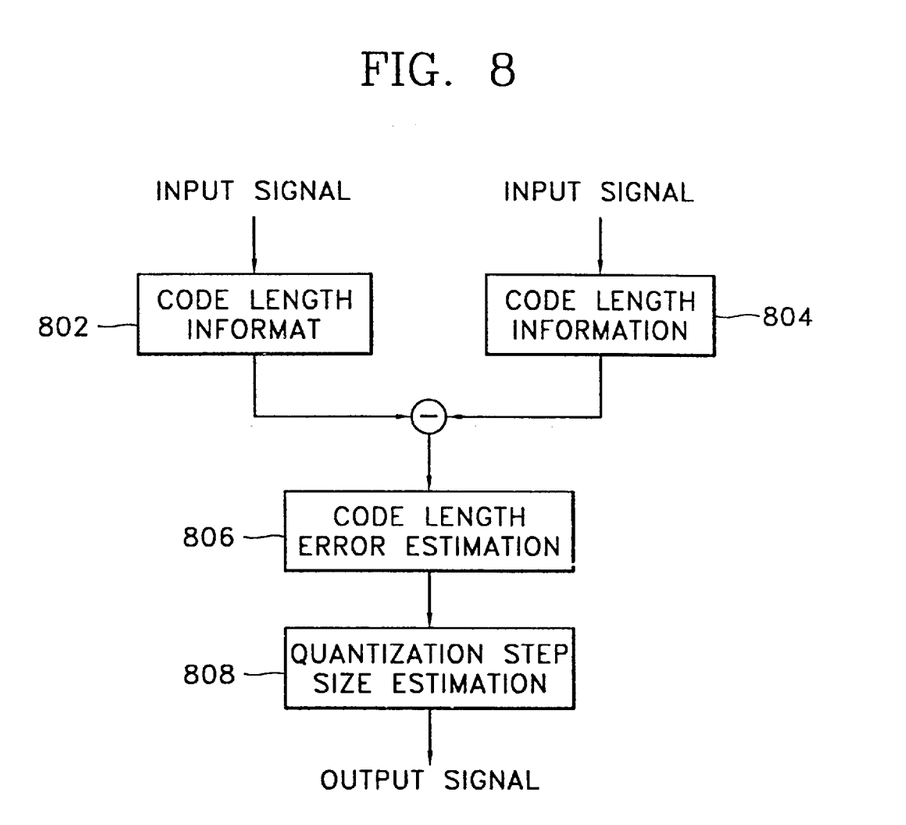
FIG. 8 is a flow chart outlining the operation of the quantization step size selecting steps shown in FIGS. 6 and 7, respectively.

Referring to FIG. 8, a flow chart outlining the quantization step size selecting processes 630 and 730 shown in FIGS. 6 and 7 is shown where the processes include extraction processes 802 and 804 for extracting code length information and target code length information whose inputs are the respective quantization step sizes, a subtraction process 800 for subtracting between the code length information and the target code length information, a code length error estimating process 806, and a quantization step size estimating process 808.

The embodiments according to the present invention will be described in more detail with reference to FIGS. 1 to 8.

FIG. 1 is a block diagram showing an encoder for recording a compressed coded signal on a fixed area. The memory capacity of an input image signal of 4:1:1 or 4:2:0 is about five times as large as that of a standard definition-video cassette recorder (hereinafter referred to as SD-VCR). Thus, signal compression and decompression are required.

Image compression techniques employed in a VCR should reflect the property of a tape as a recording medium, and should also guarantee a compiling function, a trick-play function, and a minimum error propagation. Because a tape is a sequential access medium, a frame should be coded in a small and independent unit to satisfy the above functions.

According to the present standard proposal, the independent minimum unit for compressive coding is a segment. A segment is constituted by five macroblocks. Hereinafter, a macroblock will be referred to as a small block, and a segment will be referred to as a large block.

A macroblock includes six discrete cosine transfer (DCT) blocks each of which has 8×8 size constituted by four luminance components and two color difference components, and a segment is composed of five macroblocks.

In the blocking unit 102 shown in FIG. 2, input digital image signals are first blocked in units of an orthogonal transform block which is a unit of orthogonal transform coding and then the orthogonal transform blocks are blocked in a small block unit composed of several orthogonal transform blocks. The small blocks are then blocked in a large block unit composed of several small blocks. In order to improve compression efficiency, the blocking unit 102 equally separates digital image signals input over a frame.

The minimum block unit is an orthogonal transform block, a typical example of which is a discrete cosine transfer (DCT) block. A small blocking unit 210 forms a small block from several orthogonal transform blocks, and a large blocking unit 212 receives several small blocks from the small blocking unit 210 and forms a large block. The arrangement between the small blocking unit 210 and the large blocking unit 212 shown in FIG. 2 can be reversed.

The orthogonal transform coding unit 104 receives input signals in units capable of being coded independently and performs orthogonal transform coding thereon. A typical example of orthogonal transform is DCT.

The orthogonally transformed coefficients follow two paths. One path is toward the quantization step size selecting unit 106 where a quantization step size is selected, and the other is toward the buffer 116 for delaying the orthogonally transformed coefficients during selection of the quantization step size.

In a compressive coding method, the quantization process is most important for changing variable input signals into regular size compressed coded data. The following run length coding process and variable length coding process can also reduce code quantity, to a degree, without errors, but the quantity is limited, and thus, the compression ratio depends largely on the quantization process. The quantization unit 108 performs quantization according to the quantization step size selected by the quantization step size selecting unit 106.

The coefficients quantized in the quantization unit 108 undergo run length coding (RLC) in the run length coding unit 110. The run length coding unit 110 receives the coefficients in an orthogonal transform block unit and counts the number of successive zero value coefficients until encountering a non-zero value and outputs a symbol constituted by a combination of the successive zeros and non-zero values.

The variable length coding (VLC) unit 112 receives the symbols output from the run length coding unit 110 and performs VLC thereon by allocating a short codeword to a symbol with high probability of occurrence, and a long codeword to a symbol with relatively low probability of occurrence.

The output data of the variable length coding unit 112 are irregular in length and in outputting period. Thus, the output data of the variable length coding unit 112 should be aligned to be recorded on an area having a fixed size according to a predetermined format. The data aligning unit 114 converts the output code of the variable length coding unit 112 into a regular length word and records it on an area having a fixed size.

A quantization step size selecting method, which is performed in the quantization step size selecting unit 106 shown in FIG. 1, and a device therefor, will now be described in detail.

Referring to FIG. 3, showing a first embodiment of the quantization step size selecting device 106 of the present invention, the orthogonally transformed coefficients output from the orthogonal transform coding unit 104 are received by the quantization step size selecting device. To record the code quantity output in a large block unit, composed of several small blocks, on a fixed area, the quantization step size can be given in units of an orthogonal transform block, a small block, or a large block.

Only the case where the quantization step size is given in units of a small block will be described.

A multi-step quantizer 302 shown in FIG. 3 quantizes input orthogonal transform blocks according to several fixed quantization step sizes. Such quantization can be performed in two ways. According to a first way, as shown in FIG. 5A, the input orthogonal transform coefficients undergo a bit-shift, according to a quantization step size, by a bit-shifter 510 under control of a controller 520 and thus the code quantity thereof becomes reduced. According to a second way, as shown in FIG. 5B, quantization is performed by multiplying each coefficient by a quantization table 530 under control of the controller 540.

A multi-step run length coder 304 receives the coefficients in units of an orthogonal transform block which are output from the multi-step quantizer 302 according to several quantization step sizes respectively, and performs run length coding thereon.

A multi-step accumulator 306 accumulates the output symbols of the multi-step run length coder 304 in units of a small block and outputs the results.

The normalizer 308 allocates a new target symbol value for each small block unit by using the symbols accumulated in a reference small block unit and in a reference large block unit supplied from the multi-step accumulator 306.

The quantization step size selector 310 selects a quantization step size to minimize the difference between a target symbol value given in a small block unit and the symbol value output during the multi-step quantization process. A real quantization process is performed according to the selected quantization step size.

Referring to FIG. 4, showing a quantization step size selecting device according to another embodiment of the present invention, the quantization step size selecting device has, additionally, a multi-step variable length coding unit 406 between the multi-step run length coding unit 404 and the multi-step accumulator 408, and thus the normalizer 410 does not directly receive the outputs of the multi-step run length coding unit 404, but receives the symbols output from the multi-step variable length coding unit 406 via the multi-step accumulator 408. That is, the target code length allocated to each small block is obtained not from the output of the multi-step run length coding unit 404 but from the multi-step variable length coding unit 406, and thus more precise symbol values can be obtained.

Hereinafter, the flow charts shown in FIGS. 6 and 7 outlining the operation of the quantization step size selecting units 310 and 412 shown in FIGS. 3 and 4, respectively, will be described.

First, the orthogonal transformed coefficients enter the multi-step quantization units 302 and 402. The quantization step size capable of satisfying the limitation that a large block unit of code should be recorded on a fixed size is selected in a small block unit. In this process, the most important thing is the method determining the quantization step size in a small block unit in order to make the output quantity closest to the large block unit of fixed size.

In the present invention, a plurality of quantization step sizes are used at the same time so as to obtain the symbols of the run length coding or the code length of the variable length coding, a normalizer allocates a target value to each small block using the symbols or the code length, and a quantization step size selector selects a quantization step size capable of minimizing the difference between the target value and the symbols or the code length so as to be used in a real quantizer.

First, in the reference quantization steps 610 and 712, the reference quantization step size in the reference quantization step 610 is determined as the intermediate value between the quantization step sizes used in the low level-quantization step 602 and those used in the high level-quantization step 620. Then, the normalization step 618 establishes new target values of a small block using the determined reference quantization values.

In the same way as described above, the quantized symbols according to respective quantization step sizes in the multi-step quantization steps 602, 610, and 620 (or 702, 712, and 732) undergo multi-step run length coding steps, i.e., the low level-run length coding step 604, the run length coding step 612, and the high level-run length coding step 622, in units of an orthogonal transform block respectively.

The run length coded symbols enter multi-step small block unit of accumulation steps, i.e., the low-level small block of accumulation step 606, the small block unit of accumulation step 614 and the high-level small block unit of accumulation step 624, respectively, as shown in FIG. 6, or multi-step variable length coding steps, i.e., the low-level variable length coding step 706, the variable length coding step 716 and the high-level variable length coding step 736, respectively, as shown in FIG. 7. That is, the output of the reference small block of accumulation step 614 is used in the normalization step 618 in FIG. 6, whereas in FIG. 7, the reference small block of accumulation step 718 is used in the normalization step 722.

Referring to FIG. 6, in multi-step small block unit of accumulation steps, i.e., the low-level small block of accumulation step 606, the small block unit of accumulation step 614, and the high-level small block unit of accumulation step 624, the outputs of multi-step run length coding steps 604, 612 and 622 are accumulated in units of small blocks and transmitted to a quantization step size selecting step 630. In addition, the output of the run length coding step 612, according to the reference quantization step size, undergoes not only the small block unit of accumulation step 614 but also a large block unit of accumulation step 616 where accumulation is performed in units of a large block constituted by several small blocks. The output of the large block unit of accumulation step 616 enters a normalization step 618 and allocates new target symbol value onto each small block.

Referring to FIG. 7, in the low-level small block unit of accumulation step 708, the small block unit of accumulation step 718, and the high-level small block unit of accumulation step 738, the symbol values which have undergone the multi-step run length coding steps 704, 714 and 734 according to the respective quantization step sizes and the multi-step variable length coding steps 706, 716, and 736 are accumulated in units of a small block and transmitted into a quantization step size selecting step 730.

Additionally, the symbol values having undergone the run length coding step 714 according to a reference quantization step size and the variable length coding step 716 are accumulated not only in a small block unit in the small block unit of accumulation step 718, but also in a large block unit in the large block unit of accumulation step 720. Such accumulated values are used in allocating new target symbol values onto each small block in the normalization step 722.

The principle of operation of the normalization steps 618 and 722 will be described below.

When the final outputs of the reference quantization step size are recorded on a predetermined area in a large block unit, the compressive coded data size should not be larger than the predetermined size. Thus, if the output data size is larger than the predetermined size, the quantization step size should be wide, as a whole, to reduce the code quantity. If the output data size is smaller than the predetermined area and thus there are non-recorded areas, the quantization step size should be reduced so as to increase the code quantity. Thus, it can be possible to prevent picture deterioration in decoding.

The normalization steps 618 and 722 determine the reference quantization step size capable of utilizing the available recording area to its maximum degree and thus prevent the decoded pictures from being deteriorated. That is, in the normalization steps 618 and 722, if the size of a large block unit of data according to the reference quantization step size is larger than the target value, the code quantity of the data is increased in a small block unit to make the large block unit of data be close to the target value, whereas, if it is smaller than the target value, the quantization step size should be reduced in a small block unit to make the code quantity of the large block unit of data be close to the target value. Consequently, as described above, because the increase or decrease of the code quantity is performed by regulating the small block unit of quantization step size, the step of selecting the quantization step size is most important.

Some small blocks included in a large block may have relatively more code quantity or less code quantity than others. If the large block unit of data size is larger than the target value, the quantization step size for a small block having more code quantity is selected as that capable of reducing the code quantity relatively more than other small blocks. This is because the portions with relatively more information are less sensitive to the human eye, and thus it is more effective to decrease picture deterioration in decoding.

Thus, the normalization steps 618 and 722 shown in FIGS. 6 and 7, respectively, select more effective quantization step sizes using the above principle.

The reference value of the normalization steps 618 and 722 may be the output of the run length coding step 612 as shown in FIG. 6 or the output of the variable length coding step 716 as shown in FIG. 7. In the former case, hardware size is reduced because the variable length coding step is omitted, but some error can occur because the recorded data in reality is not the run length coded data but the variable length coded data. When the output of the variable length coding step 716 as shown in FIG. 7 is used, more precise quantization step size can be obtained.

When the output value of the run length coding step is used, the variable length coding step can be omitted to some degree because the value is proportionate to the output value of the practical variable length coding device.

The normalization step 618 shown in FIG. 6, first, allocates the target symbol number corresponding to the available code length to each small block. The normalization equation used in the normalization step is as follows.

$$A = \frac{C \times D}{B} \quad (1)$$

$$A' = \frac{C' \times D'}{B'} \quad (2)$$

where, A is the available symbol number allocated to each small block;

B is the symbol number of a large block according to the reference quantization step size;

C is the symbol number of a small block according to the reference quantization step size;

D is the target symbol number corresponding to the available fixed code length corresponding to a large block;

A' is the available code length allocated to each small block;

B' is the code length of a large block according to the reference quantization step size;

C' is the code length of a small block according to the reference quantization step size; and D' is the available fixed code length corresponding to a large block.

In the quantization step according to the reference quantization step size, as shown in Equation 1, normalization is performed using the number of symbols of small blocks and large blocks and the number of allowable target symbols obtained as a result of the normalization are re-allocated in a small block unit.

D, which is the target symbol number corresponding to the available fixed code length corresponding to a large block, is obtained by taking the mean value of variable input image signals even though symbol numbers are not always the same as the fixed code lengths.

In the normalization step 722 shown in FIG. 7, available code lengths are allocated to each small block, which corresponds to Equation 2.

Using the information obtained from the normalization steps 618 and 722, quantization step sizes capable of bringing about the least amount of error are selected in the quantization step size selecting steps 630 and 730 shown in FIGS. 6 and 7, respectively.

FIG. 8 is a flow chart showing the quantization step size selecting steps 630 and 730 shown in FIGS. 6 and 7, respectively.

In FIG. 8, code length information 802 is, in the case of FIG. 6, the number of symbols obtained from the small block of accumulation steps i.e., the low-level small block of accumulation step 606, the high-level small block of accumulation step 624, and the reference small block of accumulation step 614, and in the of FIG. 7, it is the number of symbols obtained from the low-level accumulation step 708, high level accumulation step 738, and reference accumulation step 718.

The target code length information 804 is the code length information allocated to each small block by the normalization step according to the reference quantization step size. The code length error estimation step 806 estimates the error by subtracting the target code length information 804 from the code length information 802. The quantization step size estimation step 808 is an operator for selecting the quantization step size capable of producing the least value among the errors estimated in the code length error estimation step 806.

In other words, the small block unit of outputs according to the quantization step sizes are compared with the values allocated to each small block by the normalization equation, and then a quantization step size thereamong capable of minimizing the absolute difference therebetween is selected. Such selected-quantization step size is used in practice.

As described above, according to the present invention, the quantization step size selector selects the best proper quantization step size so that data can be recorded on a fixed area effectively and picture quality can be improved as well.

What is claimed is:

1. An image signal compressive coding device comprising:

blocking means for blocking image signals in fundamental block units including a small block comprising four orthogonal transform blocks of luminance components and two orthogonal transform blocks of color difference components, and a large block comprising five small blocks;

orthogonal transform coding means for performing orthogonal transform on an output of said blocking means in units of an orthogonal transform block;

a quantization step size selecting unit for receiving orthogonal transform coefficients from said orthogonal transform coding means, and for selecting a quantization step size;

a buffer for delaying said orthogonal transform coefficients until said quantization step size is selected;

a quantizer for performing quantization according to said quantization step size and for outputting quantized signals;

run length coding means for performing run length coding on said quantized signals;

variable length coding means for receiving run length coded data from said run length coding means, and for performing variable length coding on said run length coded data; and data aligning means for realigning data for recording signals output from said variable length coding means in a predetermined format, wherein said quantization step size selecting unit comprises:

a multi-step quantization means for performing quantization on small blocks output from said orthogonal transform coding means according to a plurality of predetermined quantization step sizes;

multi-step run length coding means for performing run length coding on coefficients output from said multi-step quantization means;

multi-step variable length coding means for performing variable length coding on coefficients output from said multi-step run length coding means;

multi-step accumulating means for accumulating a code length output from said variable length coding means in units of small blocks, and accumulating predetermined reference small blocks in units of reference large blocks;

normalizing means for performing normalization by using said code length accumulated in small block units and said code length accumulated in a reference large block, and for allocating a new target code length to each small block; and quantization step size selecting means for selecting a quantization step size, capable of outputting the closest value to said new target code length of said normalizing means among a plurality of quantization step sizes, given respectively to the small blocks output from said multi-step accumulating means.

2. The image signal compressive coding device as claimed in claim 1, wherein said blocking means first performs small block unit blocking and then large block unit blocking, said small block comprising several orthogonal transform blocks and said large block comprising several small blocks.

3. The image signal compressive coding device as claimed in claim 1, wherein said blocking means first performs large block unit blocking and then small block unit blocking, said large block comprising several small blocks and said small block comprising several orthogonal transform blocks.

4. The image signal compressive coding device as claimed in claim 1, wherein said multi-step quantization means bit-shifts an input signal under control of said quantization step size.

5. The image signal compressive coding device as claimed in claim 1, wherein said multi-step quantization means performs quantization by multiplying quantization step sizes by a quantization table and then dividing a result of multiplication by an input signal.

6. An image signal compressive coding method comprising the steps of:

blocking image signals in units of small blocks comprising four orthogonal transform blocks of luminance components and two orthogonal transform blocks of color difference components, and in units of a large blocks comprising five small blocks;

performing orthogonal transform coding on said image signal blocked in said blocking step in units of an orthogonal transform blocks to output orthogonal transform coefficients;

selecting a quantization step size using said orthogonal transform coefficients;

delaying said orthogonal transform coefficients until said step of selecting said quantization step size is completed;

performing quantization according to a selected quantization step size;

performing run length coding on quantized signals;

performing variable length coding on run length coded-data generated in said run length coding step; and realigning data for recording signals generated in said variable length coding step in a predetermined format, wherein said quantization step size selecting step comprises the steps of:

performing multi-step quantization on said small blocks according to a plurality of fixed quantization step sizes;

performing multi-step run length coding on coefficients produced in said multi-step quantization step;

performing variable length coding on codes produced in said multi-step run length coding step;

performing multi-step accumulation of the orthogonal transform units of code lengths generated in said multi-step variable length coding step in units of small blocks, respectively, and accumulating reference small blocks in units of a reference large block;

performing normalization according to said code lengths accumulated in a reference large block unit and said code lengths accumulated in a small block unit, and then allocating a new code length to each small block, wherein said new code length is obtained by multiplying the code length of said reference small block by an available fixed code length corresponding to a large block and then dividing the result by the code length of said reference large block; and selecting a quantization step size capable of outputting the closest value to said new code length generated in said normalizing step among said plurality of quantization step sizes given to each small block in said multi-step accumulation step.

7. The image signal compressive coding method as claimed in claim 6, wherein said blocking step comprises the steps of performing small block unit blocking first; and performing large block unit of blocking after said small block unit blocking, said small block comprising several orthogonal transform blocks and said large block comprising several small blocks.

8. The image signal compressive coding method as claimed in claim 6, wherein said blocking step comprises the steps of performing large block unit blocking first; and performing small block unit blocking after said large block unit blocking, said large block comprising several small blocks and said small block comprising several orthogonal transform blocks.

9. The image signal compressive coding method as claimed in claim 6, wherein said multi-step quantization step comprises the step of bit-shifting an input signal under control of said quantization step size.

10. The image signal compressive coding method as claimed in claim 6, wherein said multi-step quantization step comprises the steps of multiplying quantization step sizes by a quantization table and dividing the result by an input signal.

11. An image signal compressive coding device comprising:

blocking means for blocking image signals in fundamental block units including a small block comprising four orthogonal transform blocks of luminance components and two orthogonal transform blocks of color difference components, and a large block comprising five small blocks;

orthogonal transform coding means for performing orthogonal transform on an output of said blocking means in units of an orthogonal transform block;

a quantization step size selecting unit for receiving orthogonal transform coefficients from said orthogonal transform coding means, and for selecting a quantization step size;

a buffer for delaying said orthogonal transform coefficients until said quantization step size is selected;

a quantizer for performing quantization according to said quantization step size and for outputting quantized signals;

run length coding means for performing run length coding on said quantized signals;

variable length coding means for receiving run length coded data from said run length coding means, and for performing variable length coding on said run length coded data; and data aligning means for realigning data for recording signals output from said variable length coding means in a predetermined format;

wherein said quantization step size selection unit comprises:

a multi-step quantization means for performing quantization on small blocks output from said orthogonal transform coding means according to a plurality of predetermined quantization step sizes;

multi-step run length coding means for performing run length coding on coefficients output from said multi-step quantization means;

multi-step accumulating means for accumulating a code length output from said run length coding means in units of small blocks, and accumulating predetermined reference small blocks in units of reference large blocks;

normalizing means for performing normalization by using said code length accumulated in small block units and said code length accumulated in a reference large block, and for allocating a new target code length to each small block; and quantization step size selecting means for selecting a quantization step size, capable of outputting the closest value to said new target code length of said normalizing means along a plurality of quantization step sizes, given respectively to the small blocks output from said multi-step accumulating means.

* * * * *